United States Patent
Emori

(10) Patent No.: US 8,823,768 B2
(45) Date of Patent: Sep. 2, 2014

(54) CONFERENCE SYSTEM, EVENT MANAGEMENT SERVER, AND PROGRAM

(75) Inventor: Mototsugu Emori, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 170 days.

(21) Appl. No.: 13/613,568

(22) Filed: Sep. 13, 2012

(65) Prior Publication Data

US 2013/0063537 A1 Mar. 14, 2013

(30) Foreign Application Priority Data

Sep. 13, 2011 (JP) ................................. 2011-199470
Jun. 25, 2012 (JP) ................................. 2012-142012

(51) Int. Cl.
*H04N 7/14* (2006.01)
*H04N 7/15* (2006.01)

(52) U.S. Cl.
CPC ............... *H04N 7/147* (2013.01); *H04N 7/142* (2013.01); *H04N 7/15* (2013.01)
USPC ................... 348/14.09; 348/14.03; 348/14.08; 348/14.1

(58) Field of Classification Search
CPC ..... A01B 12/006; H04N 7/147; H04N 7/142; H04N 7/15; H04N 7/152; H04N 19/00424; H04N 19/00442; H04L 64/403; H04Q 2213/1324; H04Q 2213/13337
USPC ............ 348/14.01, 14.03, 14.08, 14.09, 14.1, 348/14.12
See application file for complete search history.

(56) References Cited

U.S. PATENT DOCUMENTS

| | | | |
|---|---|---|---|
| 5,659,369 A | 8/1997 | Imaiida | |
| 8,233,026 B2* | 7/2012 | Sylvain | 348/14.08 |
| 2007/0171273 A1 | 7/2007 | Saleh et al. | |
| 2008/0068446 A1* | 3/2008 | Barkley et al. | 348/14.07 |
| 2010/0008416 A1* | 1/2010 | Ben-Zedeff et al. | 375/240.02 |
| 2012/0002003 A1 | 1/2012 | Okita et al. | |
| 2012/0050197 A1 | 3/2012 | Kemmochi | |
| 2012/0086769 A1* | 4/2012 | Huber et al. | 348/14.08 |
| 2012/0216129 A1* | 8/2012 | Ng et al. | 715/753 |
| 2012/0229589 A1* | 9/2012 | Barrus | 348/14.08 |

FOREIGN PATENT DOCUMENTS

| | | |
|---|---|---|
| EP | 1 814 330 A2 | 8/2007 |
| GB | 2 285 361 A | 7/1995 |
| JP | 2006-115377 | 4/2006 |
| JP | 2006-304009 | 11/2006 |
| JP | 2012-048610 | 3/2012 |
| JP | 2012-075072 | 4/2012 |

OTHER PUBLICATIONS

The Extended European Search Report issued Oct. 22, 2013, in Application No./Patent No. 12184043.3-1905/2571263.

* cited by examiner

*Primary Examiner* — Binh Tieu
(74) *Attorney, Agent, or Firm* — Oblon, Spivak, McClelland, Maier & Neustadt, L.L.P.

(57) ABSTRACT

A conference system includes a first conference device and a second conference device installed at a first site, and is connected with an external conference device installed at a site different from the first site. The second conference device selects one from a group consisting of a video image taken by and received from the first conference device and a video image taken by the second conference device to transmit the selected video image to the external conference device. The second conference device selects a video image taken by the second conference device when the second conference device detects an event occurred at the second conference device.

13 Claims, 12 Drawing Sheets

FIG.7

```
<event id="event1234">
         <name>mouse-click</name>
         <time>2010/11/12 15:10:03</time>
         <params>
                  <param type="integer">
                           <name>x</name>
                           <value>100</value>
                  </param>
                  <param type="integer">
                           <name>y</name>
                           <value>100</value>
                  </param>
         </params>
         <device>
                  <name>INTERACTIVE WHITE BOARD 31</name>
                  <type>interective whiteboard</name>
                  <ip-address>192.168.11.11</name>
                  <port>12000</port>
                           <location id="location1">SITE C</location>
         </device>
</event>
```

FIG.8

EVENT CONDITION INFORMATION

| EVENT NAME | CONDITION | PRIORITY |
|---|---|---|
| mouse-click | - | 1 |
| mouse-move | - | 2 |
| mouse-down | - | 3 |
| mouse-up | - | 4 |
| sound | LARGE SOUND VOLUME | 5 |
| video | PERSON DETECTED/ MOTION MADE | 6 |
| mouse-right-button-down |  | 7 |
| mouse-right-button-up |  | 8 |

FIG.9

| GESTURE | OPERATION |
|---|---|
| Zoom | SCREEN ENLARGE |
| Pan | SCREEN SCROLL |
| Rotate | - |
| Swipe | PAGE SWITCH |

FIG.10

DEVICE INFORMATION

| DEVICE NAME | TYPE | IP ADDRESS | PORT NUMBER | SITE | WHETHER OR NOT VIDEO IMAGES AND VOICES OF SITE ARE ADOPTED | PRIORITY |
|---|---|---|---|---|---|---|
| INTERACTIVE WHITE BOARD 31 | interactive whiteboard | 192.168.11.11 | 11000 | SITE C | ○ | 2 |
| VIDEO CONFERENCE DEVICE 32 | teleconferencing device | 192.168.11.12 | 11001 | SITE C | × | 1 |
| INTERACTIVE WHITE BOARD 41 | interactive whiteboard | 192.168.21.11 | 11000 | SITE D | × | 2 |
| VIDEO CONFERENCE DEVICE 42 | teleconferencing device | 192.168.21.12 | 11001 | SITE D | ○ | 1 |
| INTERACTIVE WHITE BOARD 51 | interactive whiteboard | 192.168.31.11 | 11000 | SITE E | × | 2 |
| VIDEO CONFERENCE DEVICE 52 | teleconferencing device | 192.168.31.12 | 11001 | SITE E | ○ | 1 |

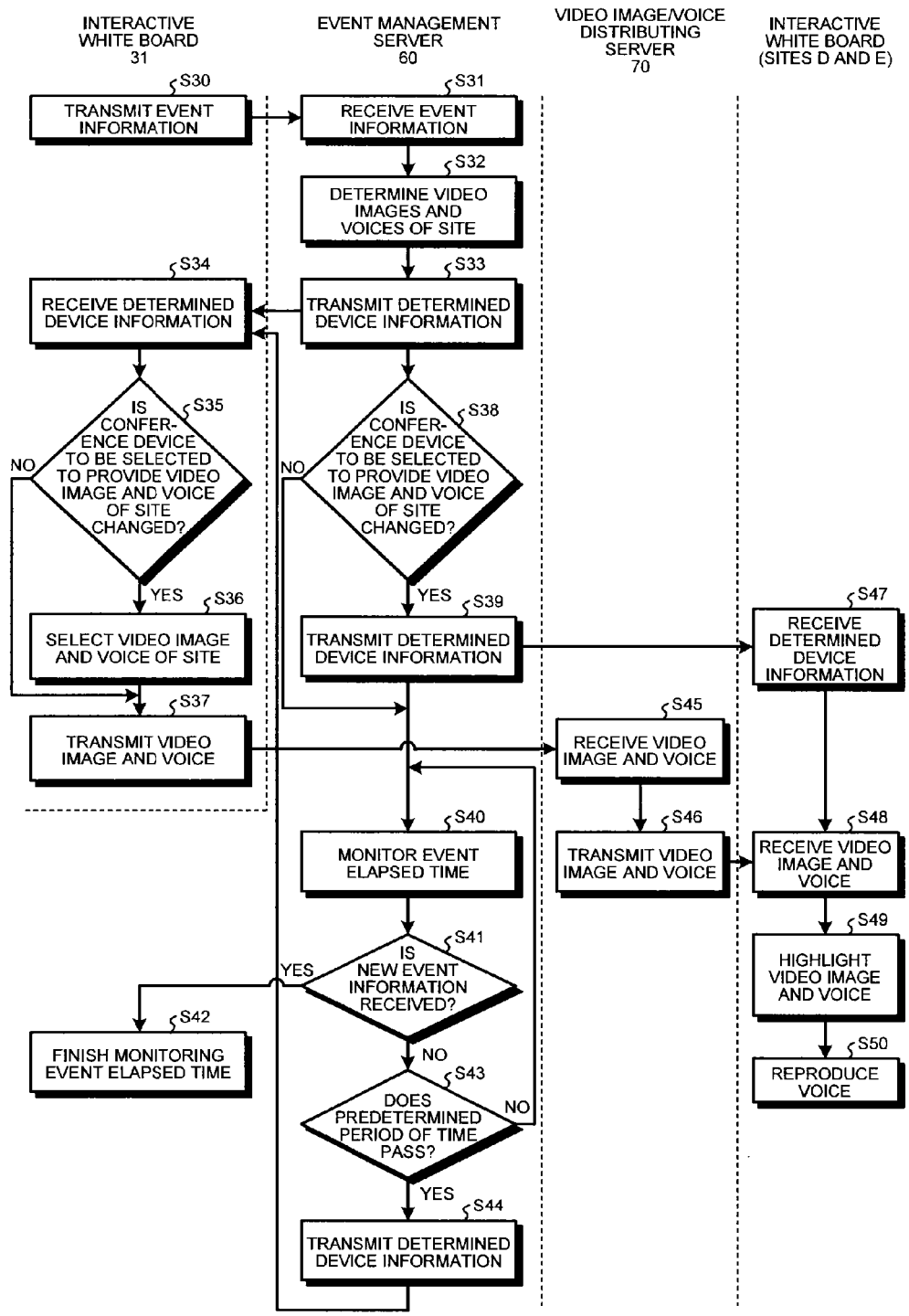

CONFERENCE SYSTEM, EVENT MANAGEMENT SERVER, AND PROGRAM

CROSS-REFERENCE TO RELATED APPLICATIONS

The present application claims priority to and incorporates by reference the entire contents of Japanese Patent Application No. 2011-199470 filed in Japan on Sep. 13, 2011 and Japanese Patent Application No. 2012-142012 filed in Japan on Jun. 25, 2012.

BACKGROUND OF THE INVENTION

1. Field of the Invention

The present invention relates to a conference system and an event management server to hold a conference through a network.

2. Description of the Related Art

Conventionally, a conference system to hold a conference by sharing a video image and voice with remote places using video conference devices having cameras, microphones and speakers are known. These video conference devices each have an integrated camera, microphone and speaker, and therefore are portable. Further, this conference system enables the video conference devices to be placed on desks and, consequently, can clearly display the vicinity of conference attendees and conference attendees.

Meanwhile, a so-called "interactive whiteboard" is known in which a touch panel is mounted on a large display having a size of about 40 inches to 60 inches using a liquid crystal or plasma flat panel or a projector. Further, most interactive whiteboards in recent years have a built-in remote conference function. For example, by using a plasma interactive whiteboard, it is possible to share not only a video image and voice but also a hand-written letter in a real time.

Further, for example, a remote conference system is disclosed which, to hold a conference by sharing a video image at each site at which a conference attendee speaks, when a pause of a speech of a conference attendee is detected, automatically switches a display on a monitor to a video image at another site (see, for example, Japanese Patent Application Laid-open No. 2006-304009).

There is a need to provide a conference system and an event management server which enable clearly displaying conference attendees, and displaying an operator when the operator operates a conference device to realize smooth communication when a conference is held.

SUMMARY OF THE INVENTION

It is an object of the present invention to at least partially solve the problems in the conventional technology.

A conference system includes a first conference device and a second conference device installed at a first site, and is connected with an external conference device installed at a site different from the first site, through a network. The first conference device includes a first image taking unit that takes a video image of a conference attendee at the first site. The second conference device includes a second image taking unit that takes a video image of a conference attendee at the first site; a video image input unit that receives the video image taken by the first image taking unit; a selecting unit that selects one from a group consisting of the video image received from the video image input unit and the video image taken by the second image taking unit; a transmitting unit that transmits the selected video image to the external conference device; and a detecting unit that detects an event which has occurred in the second conference device. When an event which has occurred at the second conference device is detected, the selecting unit selects the video image taken by the second image taking unit.

A conference system includes a first conference device and a second conference device installed at a first site, and is connected with an external conference device installed at a site different from the first site and an event management server through a network. The first conference device includes a first image taking unit that takes a video image of a conference attendee at the first site. The second conference device includes: a second image taking unit that takes a video image of a conference attendee at the first site; a video image input unit that receives the video image taken by the first image taking unit; a detecting unit that detects an event which has occurred at the first conference device and the second conference device; and a first transmitting unit that, when an event is detected at a conference device, transmits event information comprising details of the event and event occurrence device information indicating the conference device at which the event has occurred, to the event management server. The event management server includes: a memory unit that stores event condition information in which event identification information unique for each event and an event condition to detect an event when details of the event satisfy the event condition are associated with each other; a first receiving unit that receives event information from the second conference device; an event processing unit that, when details of an event in the received event information satisfies an event condition, determines a video image taken by a conference device indicated by event occurrence device information in the event information as a video image of the first site; and a second transmitting unit that transmits determined device information indicating a conference device that has taken the determined video image, to the second conference device. The second conference device further includes: a second receiving unit that receives determined device information from the event management server; and a selecting unit that selects the video image taken by a conference device indicated by determined device information. The first transmitting unit transmits the selected video image to the external conference device.

An event management server is connected with a second conference device through a network among a first conference device and the second conference device installed at a first site. The event management server includes: a memory unit that stores event condition information in which event identification information unique for each event which occurs in the first conference device and the second conference device, and an event condition to detect an event when details of the event satisfies the event condition are associated with each other; a receiving unit that receives event information comprising details of an event and event occurrence device information indicating a conference device in which the event has occurred; an event processing unit that, when details of an event in the received event information satisfy an event condition, determines a video image taken by a conference device indicated by event occurrence device information in the event information, as a video image at the first site; and a transmitting unit that transmits determined device information indicating a conference device that has taken the determined video image, to the second conference device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is an explanatory view illustrating an example of event information;

FIG. 8 is a view illustrating an example of event condition information;

FIG. 9 is a view illustrating an example of a correspondence between gestures and motions;

FIG. 10 is a view illustrating an example of device information;

FIG. 11 is a flowchart illustrating a flow of a conference held by the conference system;

DETAILED DESCRIPTION OF THE PREFERRED EMBODIMENTS

Hereinafter, embodiments of a conference system and an event management server will be described in detail with reference to the attached drawings.

First Embodiment

Figure 1:
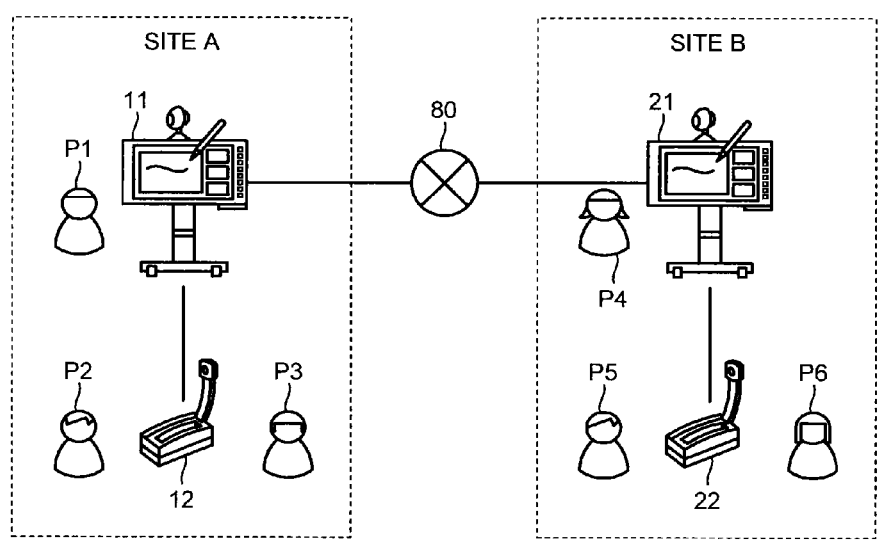
FIG. 1 is an explanatory view illustrating an entire configuration of a conference system according to a first embodiment.

FIG. 1 is an explanatory view of an entire configuration of a conference system according to a first embodiment. FIG. 1 illustrates that a conference is held between a site A and a site B. An interactive whiteboard 11, which may be also called as "interactive electronic whiteboard", and a video conference device 12 are installed at the site A, and there are conference attendees P2 and P3 around the video conference device 12 and there is an operator P1 of the interactive whiteboard 11 near the interactive whiteboard 11. Further, an interactive whiteboard 21 and a video conference device 22 are installed at the site B, and, similarly, there are conference attendees P5 and P6 around the video conference device 22 and there is an operator P4 of the interactive whiteboard 21 near the interactive whiteboard 21. In addition, the operators are also included in a conference attendee. Further, each of the interactive whiteboards and the video conference devices is one of conference devices. Furthermore, although a case will be described in the present embodiment where a conference is held at two sites, a conference may be held at three or more sites.

At each site, the interactive whiteboard and the video conference device are connected through a wired cable such as a USB (Universal Serial Bus) cable or an HDMI (High-Definition Multimedia Interface) cable, and can communicate to and from each other. Further, the interactive whiteboard and the video conference device may be configured to communicate through a LAN. Furthermore, the interactive whiteboard 11 and the interactive whiteboard 21 (external conference device) are connected through a network 80 such as a phone line, a wireless network or the Internet.

Figure 2:
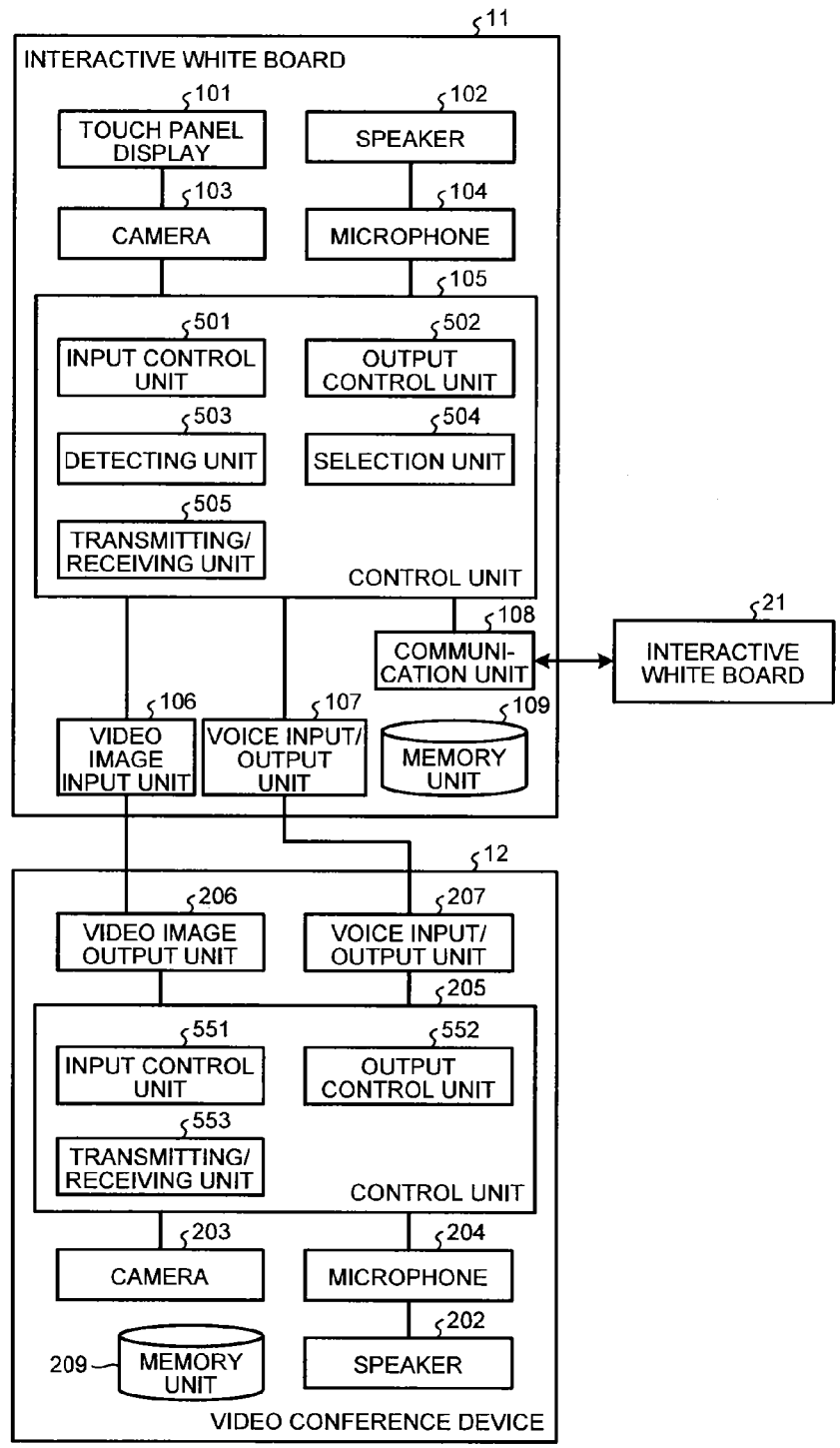
FIG. 2 is a block diagram illustrating a configuration of the conference system.

FIG. 2 is a block diagram illustrating a configuration of the conference system. Although the interactive whiteboard 11 and the video conference device 12 installed at the site A will be described below as a conference system, the same applies to an interactive whiteboard and a video conference device installed at the site B or another site.

The interactive whiteboard 11 will be described first. A conference is held while the interactive whiteboard 11 shares a video image and voice with other sites (site B) through the network 80. Further, as described above, the interactive whiteboard 11 is connected with the video conference device 12 through the wired cable, and can receive video image data and voice data from the video conference device 12, display a video image and reproduce voice. Furthermore, it is also possible to reproduce voice by transmitting voice data from the interactive whiteboard 11 to the video conference device 12. In this way, the interactive whiteboard 11 and the video conference device 12 mutually work, to share a video image and voice of one of the interactive whiteboard 11 and the video conference device 12 with another site as a video image and voice of the site A.

The interactive whiteboard 11 mainly has a touch panel display 101, a speaker 102, a camera 103, a microphone 104, a control unit 105, a video image input unit 106, a voice input/output unit 107, a communication unit 108 and a memory unit 109.

The touch panel display 101 displays electronic information (video image data) on a display. Further, the touch panel display 101 has an electronic white board function, and can enable hand-writing of a letter on the display by receiving an operation from an operator to a display with a finger or an accessory electronic pen and by detecting motion of the finger or the electronic pen.

The speaker 102 reproduces voice collected at the site A and voice received from another site. The camera 103 takes a video image of a conference attendee at the site A, in particular, the operator P1 who is operating the interactive whiteboard 11. The microphone 104 collects voice of the conference attendee at the site A, in particular, the operator P1 who is operating the interactive whiteboard 11.

The control unit 105 controls the entire interactive whiteboard 11, and mainly has an input control unit 501, an output control unit 502, a detecting unit 503, a selection unit 504 and a transmitting/receiving unit 505.

The input control unit 501 controls the camera 103 which takes a video image of a conference attendee. That is, the input control unit 501 captures a video image taken by the camera 103. Further, the input control unit 501 controls the microphone 104 which collects voice of the conference attendee, and captures the voice collected by the microphone 104.

The output control unit 502 controls the touch panel display 101 and the speaker 102. That is, the output control unit 502 displays a video image taken by the camera 103 and a camera 203 (described below), and a video image of the site B received from the communication unit 108, on the touch panel display 101. Further, the output control unit 502 reproduces voice collected by the microphone 104 and a microphone 204 (described below) and receives voice of the site B using the speaker 102.

The detecting unit 503 detects an event which occurs in the interactive whiteboard 11. More specifically, when an operation with respect to the touch panel display 101 of the interactive whiteboard 11 is received, the detecting unit 503 detects an operation event which occurs as a result of receiving of the operation. Further, when the voice collected by the microphone 104 has a predetermined sound volume or more set in advance, the detecting unit 503 detects a sound volume event which occurs when the voice has the predetermined sound volume or more. Furthermore, when a predetermined feature is found, for example, when a conference attendee makes a predetermined motion in the video image taken by the camera 103, the detecting unit 503 detects a video image event which has occurred due to the motion. Still further, the detecting unit 503 detects an event which has occurred in the video conference device 12. In this case, when, for example, an event occurs in the video conference device 12, the detecting unit 503 detects the event which has occurred in the video conference device 12 by receiving detection information indicating that the event has occurred. In addition, a case will be described with the following present embodiment where the detecting unit 503 detects the operation event.

When the detecting unit 503 detects an event such as an operation event in the interactive whiteboard 11, the selection unit 504 selects the video image and the voice taken and collected by the interactive whiteboard 11 which is a device in which the operation event has occurred, as a video image and voice of the site A. Further, when the detecting unit 503 does not detect an event in the interactive whiteboard 11, the selection unit 504 selects the video image and the voice taken and collected by the video conference device 12 as the video image and the voice of the site A. In addition, a setting is set in advance such that, when an event is not detected, the video image and the voice of the video conference device 12 are selected as the video image and the voice of the site A.

When starting a conference with another site such as the site B, the transmitting/receiving unit 505 transmits an output instruction of transmitting video image data obtained by taking a video image of a conference attendee to the video conference device 12 and voice data obtained by collecting voice of the conference attendee to the interactive whiteboard 11, to the video conference device 12.

The video image input unit 106 receives video image data taken by the video conference device 12 (a conference device other than the interactive whiteboard 11).

The voice input/output unit 107 receives voice data collected by the video conference device 12 (a conference device other than the interactive whiteboard 11). Further, the voice input/output unit 107 transmits the received voice data of the site B to the video conference device 12 to reproduce the voice data of the site B received from the interactive whiteboard 21 by unit of a speaker 202 (described below) of the video conference device 12.

The communication unit 108 transmits and receives a control signal, video image data and voice data to and from the site B. More specifically, the communication unit 108 transmits a video image (video image data) and voice (voice data) selected by the selection unit 504 as the video image and the voice of the site A, to the interactive whiteboard 21. That is, with the present embodiment, the communication unit 108 transmits ones of the video image received by the video image input unit 106 and the voice received by the voice input/output unit 107, and the video image taken by the camera 103 of the interactive whiteboard 11 and the voice collected by the microphone 104, to the interactive whiteboard 21 as the video image and the voice of the site A. Further, when starting holding a conference, the communication unit 108 transmits a conference opening notice that the conference is held, to the interactive whiteboard 21.

The memory unit 109 is an HDD (Hard Disk Drive) or a recording medium such as memory which stores taken video image data, collected voice data, and received video image data and voice data when necessary.

Next, the video conference device 12 will be described. The video conference device 12 is a portable integrated conference device which has a speaker, a camera and a microphone. Further, the video conference device 12 is connected with the interactive whiteboard 11 through a wired cable, and holds a conference by sharing a video image and voice with another site (site B) through the interactive whiteboard 11. Furthermore, the video conference device 12 can receive voice data from the interactive whiteboard 11 and reproduce the voice. Meanwhile, although the video conference device 12 is configured to transmit a video image and voice through the interactive whiteboard 11 connected to the network 80, the video conference device 12 may be configured to connect to the network 80 and transmit a video image and voice to the interactive whiteboard 11 and another site through the network 80.

The video conference device 12 mainly has the speaker 202, the camera 203, the microphone 204, a control unit 205, a video image output unit 206, a voice input/output unit 207 and a memory unit 209.

The speaker 202 reproduces voice collected at the site A, and voice received from another site. The camera 203 takes a video image of a conference attendee at the site A, in particular, conference attendees P2 and P3 around the video conference device 12. The microphone 204 collects voice of a conference attendee at the site A, in particular, the conference attendees P2 and P3 around the video conference device 12.

The control unit 205 controls the entire video conference device 12, and mainly has an input control unit 551, an output control unit 552 and a transmitting/receiving unit 553.

The input control unit 551 controls the camera 203 which takes a video image of a conference attendee and, when receiving an output instruction from the interactive whiteboard 11, starts taking a video image using the camera 203 and captures the video image taken by the camera 203. Further, the input control unit 551 controls the microphone 204 which collects voice of a conference attendee and, when receiving an output instruction from the interactive whiteboard 11, starts collecting voice using the microphone 204 and captures voice collected by the microphone 204.

The output control unit 552 controls the speaker 202, and reproduces voice collected by the microphone 104 and the microphone 204 and received voice of the site B using the speaker 202.

When a conference with another site such as the site B is started, the transmitting/receiving unit 553 receives from the interactive whiteboard 11 an output instruction of transmitting a video image and voice obtained by taking a video image of a conference attendee and collecting voice of a conference attendee, to the interactive whiteboard 11.

The video image output unit 206 transmits a video image taken by the camera 203, to the interactive whiteboard 11.

The voice input/output unit 207 transmits voice collected by the microphone 204 to the interactive whiteboard 11, and receives received voice of the site B and voice collected by the microphone 104, from the interactive whiteboard 11.

The memory unit 209 is an HDD or a storage medium such as memory which stores taken video image data, collected voice data, and received video image data and voice data when necessary.

An outline of a flow of holding a conference using a conference system which has these interactive whiteboard 11 and video conference device 12 will be described. First, the interactive whiteboard 21 at the other party site (site B) which holds a conference is invoked by operating the interactive whiteboard 11 to start sharing a video image and voice. For example, an IP address of the interactive whiteboard 21 is inputted by operating the interactive whiteboard 11 to transmit a conference opening notice indicating that a conference is held, to the interactive whiteboard 21 through the communication unit 108.

Further, the interactive whiteboard 11 starts capturing a video image and voice using the camera 103 and the microphone 104, and transmits an output instruction of a video image and voice to the video conference device 12 through the transmitting/receiving unit 505. The video conference device 12 which has received the output instruction through the transmitting/receiving unit 553 captures a video image and voice using the camera 203 and the microphone 204, and transmits the video image and the voice to the interactive whiteboard 11.

The interactive whiteboard 11 which has received the video image and the voice from the video conference device 12 selects one from a group consisting of a set of a video image and voice of the interactive whiteboard 11 and a set of a video image and voice of the video conference device 12 as the video image and the voice of the site A through the selection unit 504. Further, the communication unit 108 transmits the selected a video image and voice to the interactive whiteboard 21.

The interactive whiteboard 21 which has received the video image and the voice of the site A displays the video image on a display of the interactive whiteboard 21, and reproduces the voice using the speaker of the interactive whiteboard 21 or the speaker of the video conference device 22. Similarly, a conference is held by displaying and playing back at the site A the video image and the voice of the site B.

Figure 3:
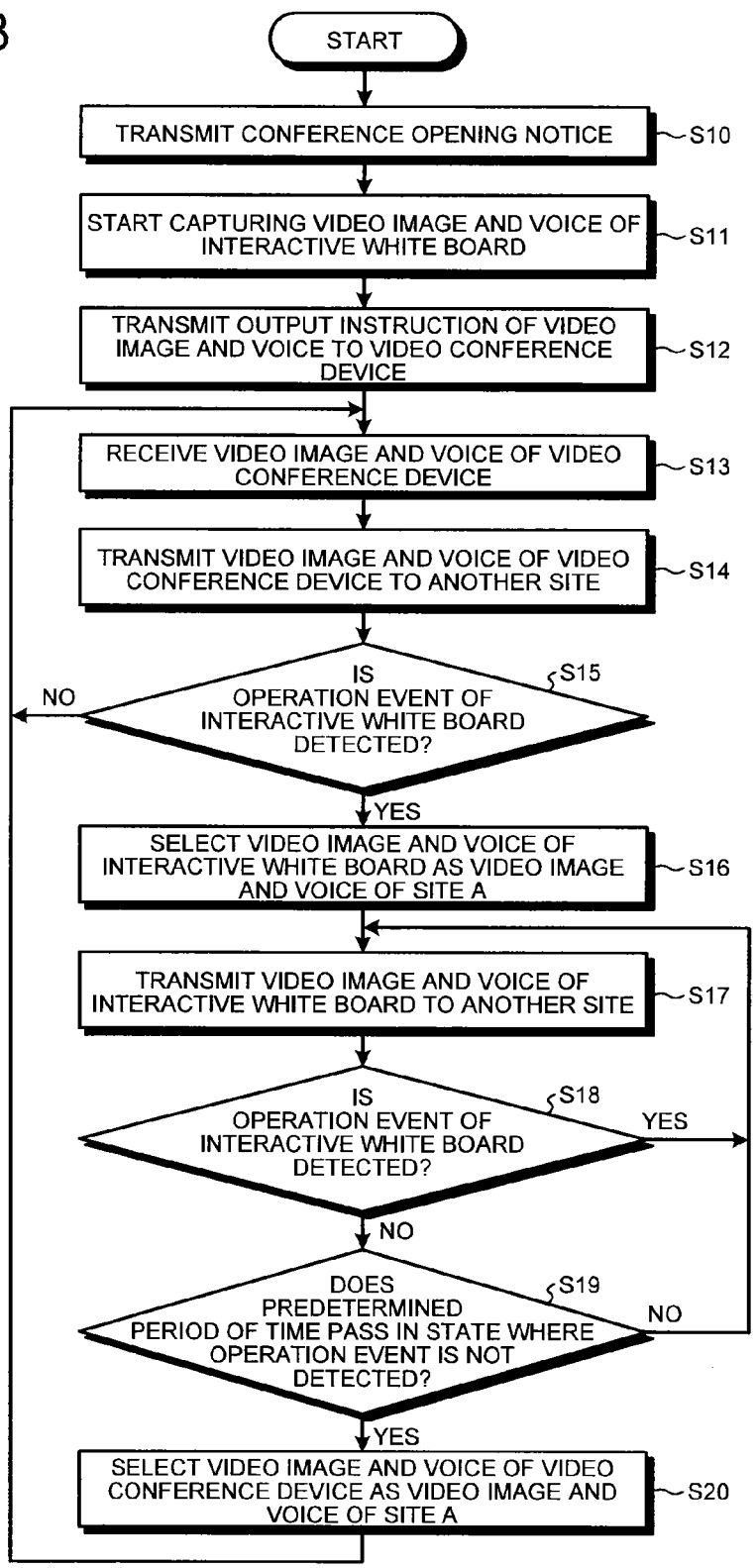
FIG. 3 is a flowchart illustrating a flow of a conference which is held by the conference system.

Next, a flow of a conference which is held using the conference system which has the interactive whiteboards and the video conference devices will be described in detail. FIG. 3 is a flowchart illustrating the flow of the conference held using the conference system. FIG. 3 illustrates that, for example, the interactive whiteboard 11 holds the conference, and transmits video image data and voice data to the interactive whiteboard 21.

First, when a conference is held, the communication unit 108 transmits a conference opening notice to the interactive whiteboard 21 (step S10). An existing method is adopted for a method of holding a conference. A conference is held using, for example, SIP (Session Initiation Protocol) or XMPP (eXtensible Messaging and Presence Protocol).

When the conference is started, the input control unit 501 starts capturing a video image and voice using the camera 103 and the microphone 104 (step S11). Further, the transmitting/receiving unit 505 transmits an output instruction of a video image and voice to the video conference device 12 (step S12). With the video conference device 12 which has received the output instruction of the video image and the voice from the interactive whiteboard 11 through the transmitting/receiving unit 553, the input control unit 551 starts capturing a video image and voice using the camera 203 and the microphone 204, and the transmitting/receiving unit 553 transmits video image data and voice data to the interactive whiteboard 11.

When the transmitting/receiving unit 505 receives video image data and voice data from the video conference device 12 (step S13), the selection unit 504 selects the video image and the voice received from the video conference device 12 as the video image and the voice of the site A, and the communication unit 108 transmits video image data and voice data received from the video conference device 12, to the interactive whiteboard 21 at the site B which is another site (step S14). Further, when receiving the video image data and the voice data, the interactive whiteboard 21 displays a video image and reproduces voice using the conference system at the site B.

Meanwhile, when the operator P1 who is the conference attendee at the site A operates the interactive whiteboard 11, an operation event occurs, and the detecting unit 503 detects an operation event of the interactive whiteboard 11. The selection unit 504 decides whether or not the operation event of the interactive whiteboard 11 is detected (step S15). When the operation event is not detected (step S15: No), the flow returns to step S13 to repeat processing.

Meanwhile, when the operation event is detected (step S15: Yes), the selection unit 504 selects the video image and the voice of the interactive whiteboard 11 as the video image and the voice of the site A (step S16). The communication unit 108 transmits the selected a video image and voice, that is, video image data and voice data taken and collected by the interactive whiteboard 11, to the interactive whiteboard 21 at the site B which is another site (step S17).

Next, the selection unit 504 decides whether or not the operation event of the interactive whiteboard 11 is detected (step S18). When the operation event is detected (step S18: Yes), the flow proceeds to step S17 to repeat processing. That is, while occurrence of the operation event of the interactive whiteboard 11 continues, the video image and the voice of the interactive whiteboard 11 are transmitted to the interactive whiteboard 21 at the site B.

Meanwhile, when the operation event is not detected (step S18: No), the selection unit 504 decides whether or not a predetermined period of time passes in a state where the operation event is not detected (step S19). When the predetermined period of time does not pass (step S19: No), the flow returns to step S17 to repeat processing.

Meanwhile, when the predetermined period of time passes (step S19: Yes), the selection unit 504 selects a video image and voice of the video conference device 12 as a video image and voice of the site A (step S20), and the flow returns to step S13 to repeat processing.

Although, when the operation event does not occur in the interactive whiteboard 11, a video image and voice of the video conference device 12 are transmitted preferentially to the site B, by contrast with this, a configuration may be employed where the video image and the voice of the interactive whiteboard 11 are transmitted preferentially to the site B, and a video image and voice of the video conference device 12 are transmitted to the site B when some event occurs in the video conference device 12. By employing a configuration of causing an operation event as an event in the video conference device 12 when the sound volume of voice of a conference attendee is a predetermined sound volume or more, it is possible to focus on a speaker during a conference.

Figure 4:
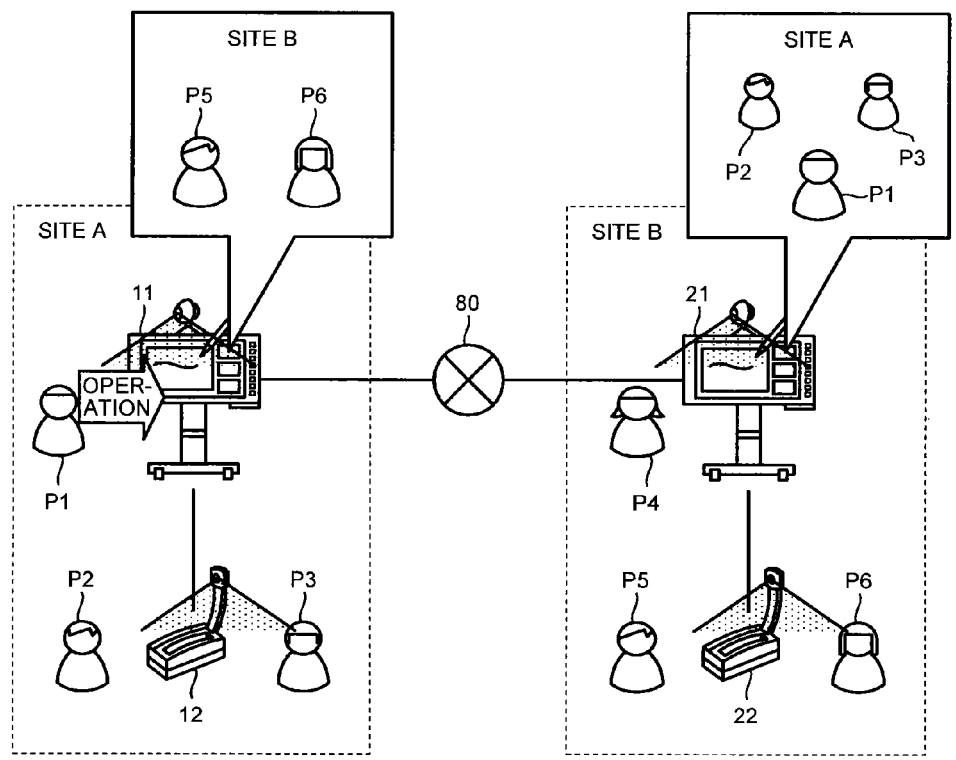
FIG. 4 is a view illustrating a video image displayed on a display of an interactive whiteboard.

Next, a video image displayed on the display of the interactive whiteboard at each site will be described. FIG. 4 is a view illustrating an example of the video image displayed on the display of the interactive whiteboard.

As illustrated in FIG. 4, when the operator P1 at the site A operates the interactive whiteboard 11, a video image taken by the interactive whiteboard 11 is selected as a video image at the site A and is displayed on the interactive whiteboard 21 at the site B. In this case, the video image of the site A may be displayed on the interactive whiteboard 11 to check the video image displayed at the other party site (site B).

Further, the interactive whiteboard 21 is not operated at the site B, and therefore the video image taken by the video conference device 22 is selected as a video image of the site B. Hence, in this case, the video image displayed on the interactive whiteboard 11 does not display the operator P4 (conference attendee) near the interactive whiteboard 21.

Thus, when holding a conference between the site A and the site B, the conference system according to the present embodiment can select one from a group consisting of a set of a video image and voice taken and collected by the interactive whiteboard 11 and a set of a video image and voice taken and collected by the video conference device 12 as a video image and voice of the site A, and transmit the video image and the voice to the other party site B. Hence, even if the video image and voice of the video conference device 12 are transmitted to the site B, when an event such as an operation event occurs in the interactive whiteboard 11, the video image and the voice of the interactive whiteboard 11 are usually transmitted to the site B. Hence, it is possible to clearly display the conference attendees P2 and P3 near the video conference device 12 and display the operator P1 when the operator P1 is operating the interactive whiteboard 11, so that it is possible to realize smooth communication when a conference is held.

Further, by detecting occurrence of an event when an operation is received in the interactive whiteboard 11, and selecting a video image and voice of the interactive whiteboard 11 as a video image and voice of the site A, it is possible to focus on a video image and voice of the operator of the interactive whiteboard 11. Furthermore, by detecting occurrence of an event when the sound volume of voice collected by the interactive whiteboard 11 or the video conference device 12 is a predetermined sound volume or more, and selecting a video image and voice of one of devices (conference devices) which needs to collect these voice as a video image and voice of the site A, it is possible to focus on a video image and voice of a speaker in the conference. Still further, by detecting occurrence of an event when a predetermined feature is found, for example, when a conference attendee makes a predetermined motion in a video image taken by the interactive whiteboard 11 or the video conference device 12, and selecting a video image and voice of one of devices (conference devices), which has taken the video image, as a video image and voice of the site A, it is possible to focus on a video image and voice of a person who is making lots of motions such as a speaker in the conference.

Moreover, the video conference device 12 (22) according to the present embodiment is an integrated device which has a camera, a microphone and a speaker and, consequently, can be easily carried, and a plurality of video conference devices can be installed in smaller space.

Second Embodiment

A conference system according to the first embodiment is configured to have an interactive whiteboard and a video conference device in a site, and select a video image and voice of a site in the interactive whiteboard and transmit the video image to voice to other sites. By contrast with this, a conference system according to the present embodiment is configured to have an interactive whiteboard and a video conference device in a site, and have an event management server and a video image/voice distributing server connected with the interactive whiteboard through a network. The event management server determines a video image and voice of a site, and the video image/voice distributing server distributes a video image and voice to other sites.

Figure 5:
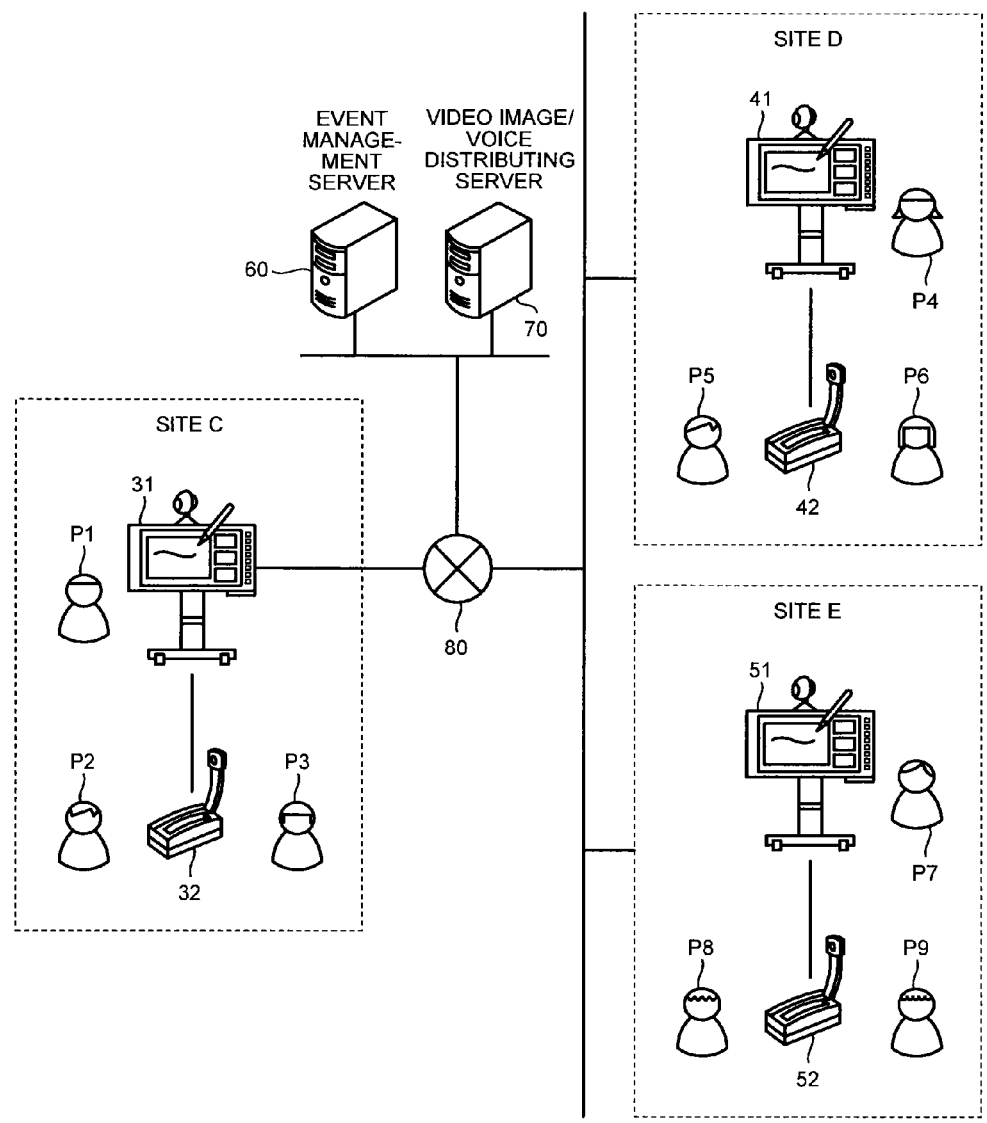
FIG. 5 is an explanatory view of an entire configuration of a conference system according to a second embodiment.

FIG. 5 is an explanatory view of an entire configuration of the conference system according to a second embodiment. FIG. 5 illustrates that a conference is held between a site C, a site D and a site E. At the site C, an interactive whiteboard 31 and a video conference device (television conference device) 32 are installed, and there are conference attendees P2 and P3 around the video conference device 32 and an operator P1 of the interactive whiteboard 31 near the interactive whiteboard 31. Further, at the site D, an interactive whiteboard 41 and a video conference device 42 are installed, and, similarly, there are conference attendees P5 and P6 around the video conference device 42 and an operator P4 of the interactive whiteboard 41 near the interactive whiteboard 41. Furthermore, at the site E, an interactive whiteboard 51 and a video conference device 52 are installed, and, similarly, there are conference attendees P8 and P9 around the video conference device 52 and there is an operator P7 of the interactive whiteboard 51 near the interactive whiteboard 51. In addition, the operators are also included in the conference attendee. Further, the interactive whiteboards and the video conference devices are also one of conference devices. Furthermore, although a case will be described with the present embodiment where a conference is held at three sites, a conference may be held at two sites or four or more sites.

At each site, the interactive whiteboards and the video conference devices are connected through wired cables similar to the first embodiment, and can communicate to and from each other. Further, the interactive whiteboard and the video conference device may communicate through a LAN. Furthermore, the interactive whiteboards 31, 41 and 51 at respective sites, an event management server 60 and a video image/voice distributing server 70 are connected through a network 80.

The event management server 60 is a server which determines which a video image and voice of a conference device (an interactive whiteboard or a video conference device) to select for a video image and voice of a site. Further, the video image/voice distributing server 70 is a server which distributes a video image and voice to multiple sites (sites D and E). Meanwhile, when a conference is held between multiple sites, the interactive whiteboard and the video conference device need to distribute video image data and voice data of one of the interactive whiteboard and the video conference device, to all other sites. However, when the interactive whiteboard or the video conference device is configured to distribute video image data and voice data to all sites, a load on a terminal becomes huge, and therefore the video image/voice distributing server 70 is used with the second embodiment.

Figure 6:
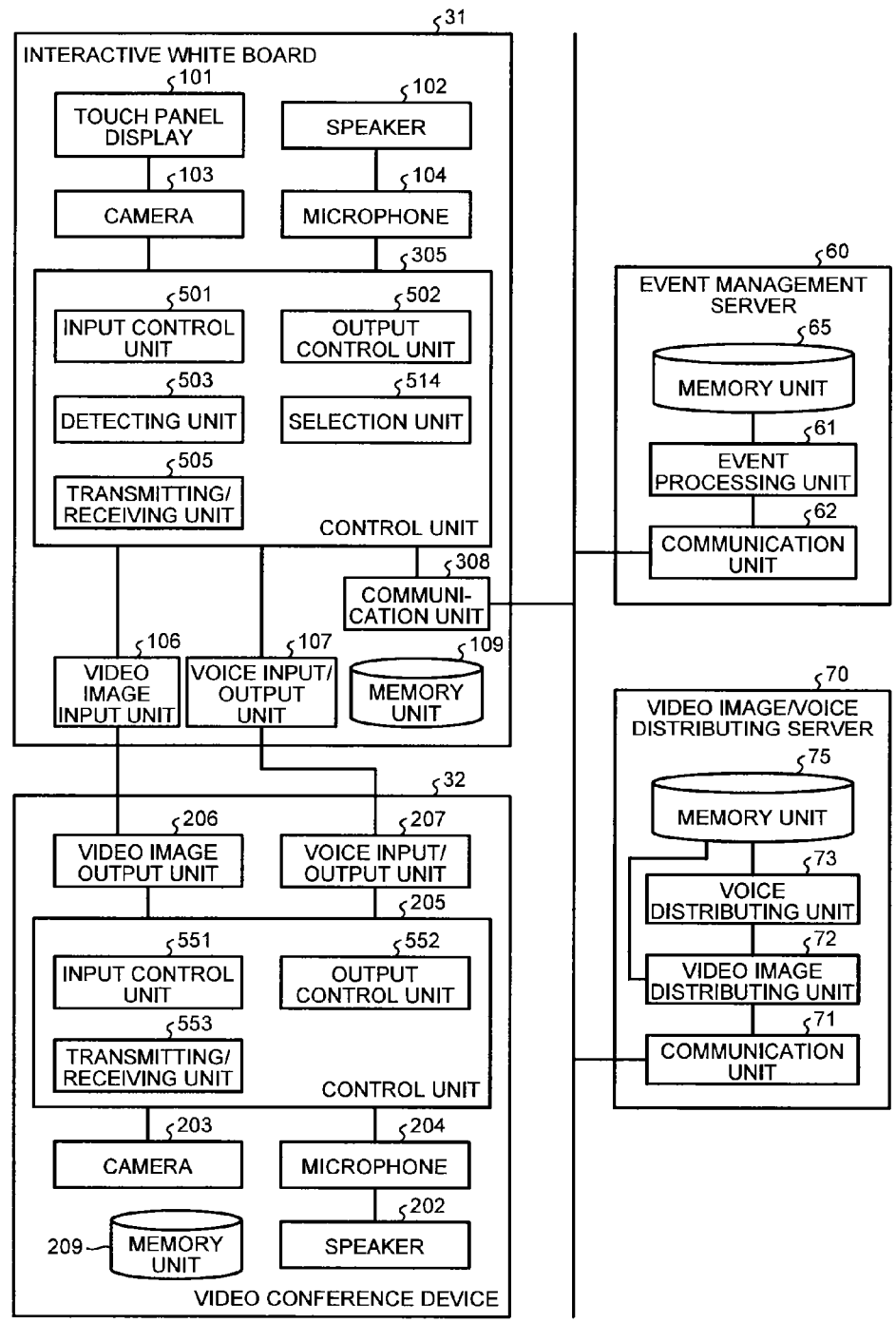
FIG. 6 is a block diagram illustrating a configuration of the conference system.

FIG. 6 is a block diagram illustrating a configuration of a conference system. Although the interactive whiteboard 31 and the video conference device 32 installed at the site C will be described below, the same also applies to the interactive whiteboards and the video conference devices installed at the sites D and E and other sites. In addition, the function and the configuration of the video conference device are the same as in the first embodiment.

First, the interactive whiteboard 31 will be described. The interactive whiteboard 31 holds a conference by sharing a video image and voice with other sites (the sites D and E) through the network 80. Further, as described above, the interactive whiteboard 31 is connected with the video conference device 32 through a wired cable, and can receive video image data and voice data from the video conference device 32, display a video image and reproduce voice. Furthermore, it is also possible to transmit voice data from the interactive whiteboard 31 to the video conference device 32 and reproduce voice. Thus, the interactive whiteboard 31 and the video conference device 32 mutually works and shares a video image and voice of one of the interactive whiteboard 31 and the video conference device 32, with other sites as a video image and voice of the site C.

The interactive whiteboard 31 has a touch panel display 101, a speaker 102, a camera 103, a microphone 104, a control unit 305, a video image input unit 106, a voice input/output unit 107, a communication unit 308 and a memory unit 109. Meanwhile, configurations and functions of the touch panel display 101, the speaker 102, the camera 103, the microphone 104, the video image input unit 106, the voice input/output unit 107 and the memory unit 109 are the same as in the first embodiment.

The communication unit 308 transmits and receives control signals, video image data and voice data between the event management server 60, the video image/voice distributing server 70 and each site. More specifically, when an event is detected in one of conference devices (the interactive whiteboard 31 or the video conference device 32), the communication unit 308 transmits event information including details of an event and event occurrence device information indicating a conference device in which the event has occurred, to the event management server 60.

Meanwhile, details of event information transmitted from the communication unit 308 will be described. FIG. 7 is an explanatory view illustrating an example of event information. As illustrated in FIG. 7, in event information, for example, an event ID (<event id>), an event name (<name>), an event occurrence time (<time>), various parameters related to the event indicating, for example, details of the event (<params>) and event occurrence device information indicating a conference device in which the event has occurred are described. With an example in FIG. 7, an operation event of "mouse-click" has occurred in the interactive whiteboard 31.

Further, the communication unit 308 receives determined device information indicating a conference device which has taken a video image determined as a video image of a site and collected voice determined as voice of the site, from the event management server 60.

Furthermore, the communication unit 308 transmits ones of the video image received by the video image input unit 106 and the voice received by the voice input/output unit 107, and a video image taken by the camera 103 of the interactive whiteboard 31 and the voice collected by the microphone 104, to the video image/voice distributing server 70 as a video image and voice of the site A based on the determined device information. Still further, when starting holding a conference, the communication unit 308 transmits a conference opening notice indicating that the conference is held, to the interactive whiteboards 41 and 51.

The control unit 305 controls the entire interactive whiteboard 31, and mainly has the input control unit 501, the output control unit 502, the detecting unit 503, a selection unit 514 and the transmitting/receiving unit 505. Meanwhile, configurations and functions of the input control unit 501, the output control unit 502, the detecting unit 503 and the transmitting/receiving unit 505 are the same as in the first embodiment.

The selection unit 514 selects a video image and voice as a video image and voice of a site based on the determined device information received from the event management server 60. That is, the selection unit 514 decides whether or not the conference device of the video image and voice of the site to be selected is changed, referring to the determined device information, and selects the video image and voice of the conference device which have been identical so far, as a video image and voice of the site when the conference device is not changed. Meanwhile, when the conference device is changed, the selection unit 514 selects a video image and voice of the conference device indicated by the determined device information as a video image and voice of the site. When, for example, receiving the determined device information indicating a conference device in which an event has occurred, the selection unit 514 selects a video image and voice taken and collected by the conference device in which the event has occurred, as a video image and voice of the site.

Next, the event management server 60 will be described. The event management server 60 mainly includes an event processing unit 61, a communication unit 62 and a memory unit 65.

The communication unit 62 receives event information including details of an event which has occurred in the interactive whiteboard 31 or the video conference device 32, and event occurrence device information indicating a conference device in which the event has occurred. Further, the communication unit 62 transmits the determined device information indicating a conference device which has taken a video image determined as a video image of the site by the event processing unit 61 and collected voice determined as voice of the site, to the interactive whiteboard 31 of the site C and the interactive whiteboards 41 and 51 of the other sites.

The memory unit 65 has a database which includes information which is necessary to determine a video image and voice of the site. First, the memory unit 65 stores event condition information in which event identification information unique for each event, an event condition to detect an event when details of the event satisfy the event condition and order of priority of events which have occurred in a conference device are associated with each other. This is information which the event management server 60 uses to determine which a video image and voice of a conference device to select for a video image and voice of the site.

FIG. 8 is a view illustrating an example of event condition information. As illustrated in FIG. 8, in the event condition information, event names which are event identification information, event conditions (conditions of details of events) and rankings in the order of priority of events are associated with each other.

FIG. 8 illustrates that event condition information is described in case that a video image and voice of the site are determined. That is, appropriated events such "sound" and "video" are also defined in addition to basic events such as "mouse-click", "mouse-move", "mouse-down", "mouse-up", "mouse-right-button-down", and "mouse-right-button-up". When a basic event such as "mouse-click", "mouse-move", "mouse-down", "mouse-up", "mouse-right-button-down" or "mouse-right-button-up" occurs in the interactive whiteboard 31, a video image and voice of the interactive whiteboard 31 which has caused the event are determined as a video image and voice of the site.

Further, "sound" configures the interactive whiteboard 31 to detect occurrence of an event when the sound volume of the voice collected by the microphone 104 is a predetermined sound volume or more set in advance ("large sound volume" of event conditions). Furthermore, a video image and voice of the interactive whiteboard 31 which has caused the event are determined as the video image and the voice of the site.

Still further, "video" configures the interactive whiteboard 31 to detect occurrence of an event when a predetermined feature is found, for example, when a conference attendee is detected in a video image taken by the camera 103, and this conference attendee makes a predetermined motion ("person detected/motion made" of the event conditions). Moreover, the video image and the voice of the interactive whiteboard 31 which has caused the event are determined as a video image and voice of the site. In addition, these can be realized using an existing speech recognition technique and person recognition technique.

Thus, by enabling the interactive whiteboard 31 to detect not only a simple event (basic event) but also occurrence of a complex event, it is possible to select and transmit a video image and voice of the interactive whiteboard 31 at an appropriate timing. In addition, when occurrence of an event which is not described in this description is detected, a video image and voice of the interactive whiteboard 31 are not selected as a video image and voice of the site.

Further, these events are likely to occur at substantially the same time, and therefore order of priority is set to events in advance as illustrated in FIG. 8. In this case, "mouse-click" is an event which is prioritized the most.

Further, the interactive whiteboard 31 generates a unique event matching an operation of an application loaded to, for example, the interactive whiteboard 31 in addition to the above basic events (basic events). Although, for example, a dedicated application such as a white board is loaded to the interactive whiteboard 31, it is possible to create new pages or switch pages using this white board. Meanwhile, when new pages are created, it is strongly predicted that users change subjects. Consequently, it is possible to give a visual attention to remote users by detecting these events and switching a screen.

Further, it is possible to write letters on the interactive whiteboard 31 using a dedicated electronic pen, this electronic pen has a button. When the button of the electronic pen is pushed, the interactive whiteboard 31 detects that the button is pushed, and maps on "mouse-right-button-down" and "mouse-right-button-up" events. Meanwhile, when detecting the "mouse-right-button-down" event, the application in the interactive whiteboard 31 switches a mode of the electronic pen from a write mode to an eraser mode until the "mouse-right-button-up" event is detected. When the mode is switched to the easer mode, it is strongly predicted that a user corrects written letters. Hence, it is possible to give a visual attention to remote users by detecting this event and switching the screen.

Further, it is also possible to generate a unique event by combining the above basic events. For example, a gesture is recognized by detecting movement of a mouse cursor from the "mouse-move" event. The gesture includes types such as "Zoom", "Pan", "Rotate" and "Swipe". The application in the interactive whiteboard 31 performs an operation matching each of these gestures.

FIG. 9 is a view illustrating an example of the correspondence between gestures and operations. FIG. 9 illustrates an example where "Zoom", "Pan" and "Swipe" are associated with "screen enlarge", "screen scroll" and "page switch", respectively. In addition a symbol "-" represents that no operation is assigned to "Rotate".

When, for example, "Swipe" is recognized, the application in the interactive whiteboard 31 switches a page. When a page is switched, it is strongly predicted that the user changes subjects. Consequently, it is possible to give a visual attention to remote users by detecting this event and switching a screen.

Further, for example, a notebook computer may be connected to the interactive whiteboard 31 to display the screen of the notebook computer. When the interactive whiteboard 31 is connected to the notebook computer, it is strongly predicted that the user starts presentation. Consequently, it is possible to give a visual attention to remote users by detecting this event and switching the screen.

Further, it is also possible to switch the screen by causing an event when red letters start being hand-written on the interactive whiteboard 31, and detecting this event. Red letters are likely to be inputted when letters need to be emphasized. Consequently, it is possible to give a visual attention to remote users by detecting this event and switching the screen.

As described above, the interactive whiteboard 31 generates various unique events, and effectively switches the screen using these unique events. In addition, which basic event or appropriated event is used to switch the screen and at which timing the screen is switched are determined by, for example, the event management server 60.

Further, the memory unit 65 stores device information in which device identification information unique for each of a plurality of conference devices (interactive whiteboard and video conference device), and order of priority of the conference devices to determine a conference device, a video image and voice taken and collected by which are selected as a video image and voice of the site, are associated. FIG. 10 is a view illustrating an example of device information. As illustrated in FIG. 10, in device information, each of device names which are device identification information ("interactive whiteboard 31" and "video conference device 32"), each of types ("Interactive whiteboard" and "teleconferencing device"), each of IP addresses ("192.168.11.11" and "192.168.11.12"), each of port numbers ("11000" and "11001"), each of pieces of information on a site at which a corresponding conference device is installed ("site C" and "site D"), each of pieces of information indicating whether or not a video image and voice of the site are used (o or x), and each of ranking in order of priority of the conference devices in each site are associated with each other.

When receiving event information of the conference device, the event management server 60 decides whether or not the conference device is adopted for a video image and voice of the current site, referring to information about this device. Further, even when a predetermined period of time set in advance passes after event information is received and new event information is not transmitted from the conference device, the event management server 60 decides whether or not a video image and voice of another conference device are determined as a video image and voice of the site, referring to information about this device. For example, although a video image and voice of the interactive whiteboard 31 are being distributed at the site C to other sites (sites D and E) as a video image and voice of the site C, when a predetermined period of time passes after event information is received from the interactive whiteboard 31, the event management server 60 determines a video image and voice of the video conference device 32 of a higher priority than the interactive whiteboard 31 as a video image and voice of the site C, and outputs an instruction of transmitting the video image and the voice of the video conference device 32.

The event processing unit 61 determines which a video image and voice of a conference device to select for a video image and voice of a site, referring to event condition information and device information stored in the memory unit 65. More specifically, when details of the event in event information received from the interactive whiteboard 31 satisfies the event conditions stored in the memory unit 65, a video image and voice taken and collected by the conference device indicated by the event occurrence device information of the event information are determined as a video image and voice of the site C.

Further, when a predetermined period of time passes after event information is received, if new event information is not received, the event processing unit 61 determines a video image and voice taken and collected by a conference device of a higher priority among conference devices in the device information stored in the memory unit 65 as the video image and voice of the site C. Furthermore, when a plurality of pieces of event information are received substantially simultaneously (received simultaneously or successively), the event processing unit 61 determines a video image and voice taken and collected by a conference device in which an event of a high priority among events in event condition information stored in the memory unit 65 occurs, as the video image and the voice of the site C.

Still further, when a video image and voice of the site are determined based on the received event information, the event processing unit 61 transmits determined device information indicating a conference device which has taken a video image determined as a video image of a site and collected voice determined as voice of the site, to the interactive whiteboard 31 of the site C and the interactive whiteboards 41 and 51 of the other sites through the communication unit 62.

Moreover, the event management server 60 may be configured to collectively manage and process events to change an operation due to occurrence of an event in a conference device at another site (a site which is a transmission destination of a video image and voice). That is, although, when, for example, an operation event occurs in the interactive whiteboard 31, a video image and voice of the interactive whiteboard 31 are distributed to other sites, the interactive whiteboards at the other sites which have received the video image and the voice can highlight a video image and notify to conference attendees that the interactive whiteboard 31 is being operated.

Next, the video image/voice distributing server 70 will be described. The video image/voice distributing server 70 mainly has a communication unit 71, a video image distributing unit 72, a voice distributing unit 73 and a memory unit 75.

The communication unit 71 receives a video image and voice from the interactive whiteboards 31, 41 and 51 at respective sites.

The memory unit 75 stores device information. When receiving the video image and the voice, the video image/voice distributing server 70 uses this information to distribute the video image and the voice to the conference devices (interactive whiteboards) at the other sites. Details of device information are the same as device information stored in the event management server 60 (see FIG. 10).

The video image distributing unit 72 distributes the video image received by the communication unit 71, to the interactive whiteboards at all other sites (sites other than the site at which the interactive whiteboard which has received the video image is installed), referring to the device information stored in the memory unit 75. The voice distributing unit 73 distributes the voice received from the communication unit 71 to the interactive whiteboards at all other sites (sites other than the site at which the interactive whiteboard which has received the voice is installed), referring to the device information stored in the memory unit 75. When, for example, the video image and the voice are received from the interactive whiteboard 31, the communication unit 71 distributes a video image and voice (the interactive whiteboard 41 and the interactive whiteboard 51) at the site D and the site E.

In addition, the video image distributing unit 72 and the voice distributing unit 73 may distribute the received video image and voice as is, or compress, encrypt and distribute the video image and the voice according to a specification or a state of a line. Further, although one video image/voice distributing server 70 distributes video image and voice, video image and voice may be distributed by separate servers. Furthermore, device information of the event management server 60 may be configured to be referred to as device information.

Next, a flow of a conference held in a conference system which has interactive whiteboards, video conference devices, an event management server and a video image/voice distributing server will be described in details. FIG. 11 is a flowchart illustrating a flow of a conference held in the conference system. FIG. 11 illustrates that, for example, video image data and voice data are transmitted from the interactive whiteboard 31 at the site C to the interactive whiteboard 41 at the site D and the interactive whiteboard 51 of the site E.

When occurrence of an event is detected in the conference device at the site C, the communication unit 308 of the interactive whiteboard 31 transmits event information to the event management server 60 (step S30). The communication unit 62 of the event management server 60 receives event information (step S31).

Further, the event processing unit 61 determines the video image and the voice of the site C from the video image and the voice of one of the interactive whiteboard 31 and the video conference device 32, referring to event condition information and device information (step S32). Furthermore, when the event processing unit 61 determines the video image and the voice of the site C, the communication unit 62 transmits determined device information indicating a conference device which has taken and collected the determined video image and voice, to the interactive whiteboard 31 (step S33).

The communication unit 308 of the interactive whiteboard 31 receives the determined device information from the event management server 60 (step S34). The selection unit 514 decides whether or not a conference device to be selected to providing a video image and voice of the site is changed, by referring to the determined device information (step S35), and, when the conference device is not changed (step S35: No), does not change selection of the video image and the voice of the site and proceeds to processing in step S37. Meanwhile, when the conference device is changed (step S35: Yes), the selection unit 514 selects the video image and the voice of the conference device indicated by the determined device information as a video image and voice of the site (step S36). Further, the communication unit 308 transmits the selected video image and voice to the video image/voice distributing server 70 (step S37).

Back to processing of the event management server 60, after the determined device information is transmitted in step S33, the event processing unit 61 decides whether or not a conference device to be selected to provide a video image and voice of the site is changed, referring to the determined device information (step S38) and, when the conference device is not changed (step S38: No), the flow proceeds to processing in step S40. Meanwhile, when the conference device is changed (step S38: Yes), the communication unit 62 transmits the determined device information to the interactive whiteboards at the other sites (step S39).

Further, the event processing unit 61 monitors an event elapsed time (step S40), and decides whether or not new event information is received (step S41). This unit that, when, for example, the interactive whiteboard 31 is not operated and event information is not transmitted, distribution of the video image and the voice is returned to the video conference device 32. When new event information is received (step S41: Yes), monitoring of the event elapsed time is finished (step S42), and processing is finished. That is, processing is repeated from step S31.

Meanwhile, when new event information is received (step S41: No), whether or not a predetermined period of time set in advance has passed is decided after event information is received in step S31 (step S43) and, when the predetermined period of time does not pass (step S43: No), the flow returns to step S40 to repeat processing.

Meanwhile, when the predetermined period of time passes (step S43: Yes), a video image and voice taken and collected by a conference device of a higher priority among conference devices in device information are determined as a video image and voice of the site C, the determined device information is transmitted to the interactive whiteboard 31 (step S44), and processing in step S34 is performed.

In the video image/voice distributing server 70, when a video image and voice are transmitted from the interactive whiteboard 31 in step S37, the communication unit 71 receives the a video image and the voice (step S45). Further, the video image distributing unit 72 and the voice distributing unit 73 transmit the received video image and voice to the interactive whiteboards 41 and 51 at the other sites (step S46).

The interactive whiteboards 41 and 51 at the other sites receive the determined device information when the determined device information is transmitted from the event management server 60 in step S39 (step S47). Further, when the communication unit receives the video image and voice (step S48), the output control unit displays the video image on a display, highlights frames of the video image upon display of the video image (step S49), and reproduces the voice from the speaker (step S50). In addition, either of an interactive whiteboard and a video conference device may be configured to reproduce voice.

With the present embodiment, although a video image and voice transmitted to the video image/voice distributing server 70 are configured to be transmitted to the video image/voice distributing server 70 by the interactive whiteboard 31 by selecting video image data and voice data of one of the interactive whiteboard 31 and the video conference device 32, by contrast with this, the video conference device 32 may be configured to be transmitted.

Further, with the present embodiment, the interactive whiteboard 31 is configured to transmit event information of both of the interactive whiteboard 31 and the video conference device 32 to the event management server 60. However, the video conference device 32 may also be configured to connect to the network 80 to transmit event information from respective conference devices to the event management server 60. Further, the video conference device 32 may also be configured to connect to the network 80 and transmit a video image and voice from one of conference devices which has received the determined device information from the event management server 60.

Thus, when the conference system according to the present embodiment holds a conference between the site C, the site D and the site E, if an event occurs in a conference device, event information is transmitted from the interactive whiteboard 31 to the event management server 60. Further, the event management server 60 determines ones of the video image and the voice taken and collected by the interactive whiteboard 31 and the video image and the voice taken and collected by the video conference device 32 as the video image and the voice of the site C, the interactive whiteboard 31 selects the video image and the voice of the site C according to this determination, and transmits the video image and the voice to the site D and the site E through the video image/voice distributing server 70. Hence, even when the video image and the voice of the video conference device 32 are usually transmitted to the site D and the site E, if an event such an operation event occurs in the interactive whiteboard 31, it is possible to transmit the video image and the voice of the interactive whiteboards 31 to the site D and the site E. Consequently, it is possible to clearly display the conference attendees P2 and P3 near the video conference device 32 and display the operator P1 when the operator P1 is operating the interactive whiteboard 31, so that it is possible to realize smooth communication when a conference is held.

Further, by detecting occurrence of an event when an operation is received in the interactive whiteboard 31, and selecting a video image and voice of the interactive whiteboard 31 as the video image and the voice of the site C, it is possible to focus on the video image and voice of the operator of the interactive whiteboard 31. Furthermore, by detecting occurrence of an event when the sound volume of the voice collected by the interactive whiteboard 31 or the video conference device 32 is a predetermined sound volume or more, and selecting a video image and voice of the one of devices (conference devices) which needs to collect the voice as a video image and voice of the site C, it is possible to focus on the video image and voice of the speaker at a conference. Still further, by detecting occurrence of an event when a predetermined feature is found, for example, when a conference attendee makes a predetermined motion in a video image taken by the interactive whiteboard 31 or the video conference device 32, and selecting a video image and voice of one of devices (conference device), which has taken the video image, as the video image and the voice of the site C, it is possible to focus on a video image and voice of a person who is frequently making motions such as a speaker at a conference.

Moreover, the event management server 60 is provided, so that it is possible to centralize event management and notify occurrence of an event to conference devices at the other sites. Moreover, the event management server 60 stores the priority of the conference device of the taken video image and the collected voice which are determined as a video image and voice of the site, and can determine the video image and the voice of the site according to the priority, so that it is possible to select a video image and voice of a conference device of a higher priority as the video image and voice of the site when an event does not occur in the conference device. Moreover, the event management server 60 stores order of priority of events which occur in the conference devices and can determine the video image and the voice of the site according to the order of priority, so that it is possible to easily determine the video image and the voice of the site even when events occur substantially simultaneously and prevent the video image and the voice from being frequently switched.

Figure 12:
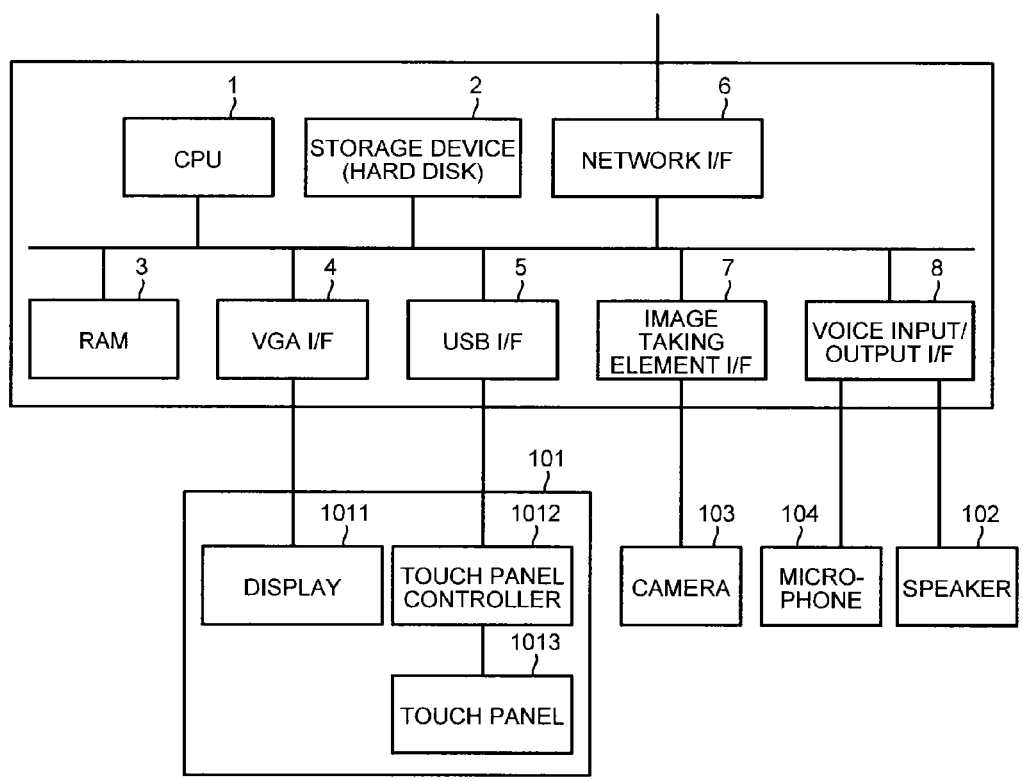
FIG. 12 is a view illustrating a hardware configuration of the interactive whiteboard according to the first and second embodiments.

Next, a hardware configuration of the interactive whiteboard will be described. FIG. 12 is a view illustrating the hardware configuration of the interactive whiteboard according to the first and second embodiments. As illustrated in FIG. 12, the interactive whiteboard has a CPU (Central Processing Unit) 1, a hard disk 2, a RAM (Random Access Memory) 3, a VGA interface (VGA I/F) 4 and a USB interface (USB I/F) 5.

The CPU 1 is a control unit which executes various programs for controlling the device itself. The hard disk 2 is a storage device which stores the above various programs and written data. In the RAM 3, the various programs and the written data stored in the hard disk 2 are expanded for processing in the CPU 1. The VGA I/F 4 is an interface which connects a display 1011 in the touch panel display 101. The USB I/F 5 is an interface for connecting a touch panel 1013.

Further, an image taking element I/F 7 is an interface which connects with the camera 103 and acquires an image taken by the camera 103. A voice input/output I/F 8 is an interface which connects the microphone 104 and the speaker 102, and receives an input of voice from the microphone 104 and outputs voice through the speaker 102. Further, a touch panel controller 1012 controls the touch panel 1013. The interactive whiteboard further has a network I/F 6, and is connected with the interactive whiteboards at the other sites.

Figure 13:
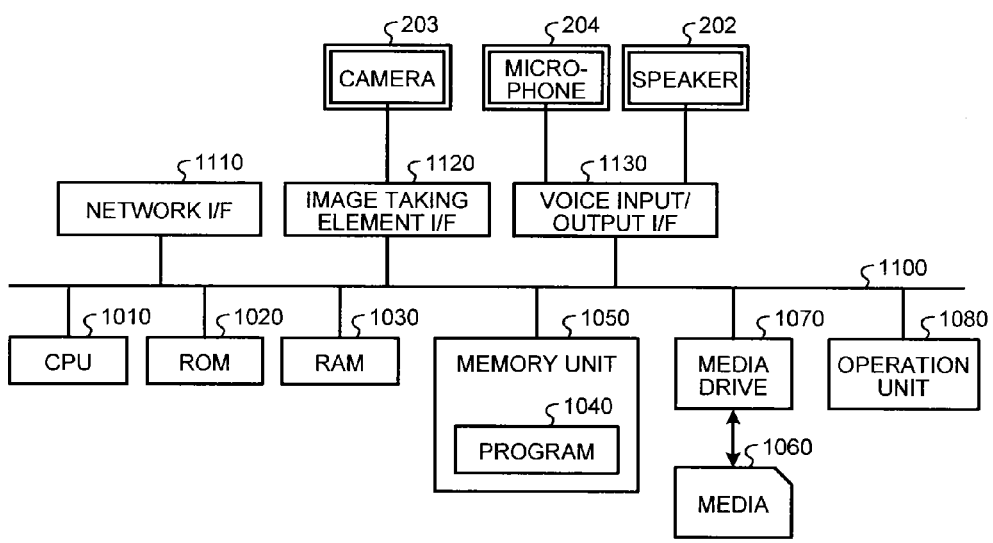
FIG. 13 is a view illustrating a hardware configuration of the video conference device according to the first and second embodiments.

Next, a hardware configuration of a video conference device will be described. FIG. 13 is a view illustrating the hardware configuration of the video conference device according to the first and second embodiments. As illustrated in FIG. 13, the video conference device has a CPU 1010, a ROM 1020, a RAM 1030, a memory unit 1050, a media drive 1070, an operation unit 1080, a network I/F 1110, an image taking element I/F 1120 and a voice input/output I/F 1130, and each unit is mutually connected by a bus 1100.

The CPU 1010 expands to the RAM 1030 and sequentially executes a program 1040 stored in the ROM 1020 and the memory unit 1050 to perform central control of the operation of the video conference device. The memory unit 1050 is an HDD or an SSD (Solid State Drive), and stores data as readable and writable data. More specifically, the memory unit 1050 stores the program 1040 to be executed by the CPU 1010 and various pieces of setting information. Upon an update, the program 1040 and the various pieces of setting information stored in this memory unit 1050 are updated.

The media drive 1070 is a drive device for reading and writing data in and from media 1060 such as an optical disk. The operation unit 1080 is a keyboard and various operation keys, and receives an operation input from the user. The network I/F 1110 is an interface which connects with the network to perform data communication.

The image taking element I/F 1120 is an interface which connects with the camera 203, and acquires a video image taken by the camera 203. The voice input/output I/F 1130 is an interface which connects with the microphone 204 and the speaker 202, and receives an input of voice from the microphone 204 and output voice through the speaker 202.

Programs executed by the interactive whiteboard according to the present embodiment are provided by being recorded in a computer-readable recording medium such as a CD-ROM, a flexible disk (FD), a CD-R and a DVD (Digital Versatile Disk) in an installable format or an executable format.

Further, a configuration may be employed where programs executed by the interactive whiteboard according to the present embodiment are provided by being stored on a computer connected with a network such as the Internet and downloading the programs through the network. Furthermore, a configuration may be employed where the programs executed by the interactive whiteboard according to the present embodiment may be provided or distributed through the network such as the Internet.

Still further, a configuration may be employed where the programs according to the present embodiment may be provided by being embedded in, for example, the ROM. The programs executed by the interactive whiteboard according to the present embodiment employ a module configuration including each of above units, and a CPU (processor) which is actual hardware reads and executes a communication program from the above recording medium, so that each of the above units is loaded on a main storage device and each of the above units is generated on the main storage device.

The present invention provides an advantageous effect that it becomes possible to clearly display conference attendees, and display an operator when the operator operates a conference device to realize smooth communication when a conference is held.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A conference system that comprises a first conference device and a second conference device installed at a first site, and that is connected with an external conference device installed at a site different from the first site, through a network, wherein:
the first conference device comprises:
a first image taking unit that takes a video image of a conference attendee at the first site,
the second conference device comprises:
a second image taking unit that takes a video image of a conference attendee at the first site;
a video image input unit that receives the video image taken by the first image taking unit;

a selecting unit that selects one from a group consisting of the video image received from the video image input unit and the video image taken by the second image taking unit;

a transmitting unit that transmits the selected video image to the external conference device; and a detecting unit that detects an event which has occurred in the second conference device, and when an event which has occurred at the second conference device is detected, the selecting unit selects the video image taken by the second image taking unit.

2. The conference system according to claim 1, wherein:
the first conference device further comprises:
a first voice collecting unit that collects voice of a conference attendee at the first site,
the second conference device further comprises:
a second voice collecting unit that collects voice of a conference attendee at the first site; and
a voice input unit that receives the voice collected by the first voice collecting unit,
the selecting unit selects one from a group consisting of a set of the video image received from the video image input unit and the voice received from the voice input unit, and a set of the video image taken by the second image taking unit and the voice collected by the second voice collecting unit,
the transmitting unit transmits the selected video image and voice to the external conference device, and
when an event which has occurred at the second conference device is detected, the selecting unit selects the video image taken by the second image taking unit and the voice collected by the second voice collecting unit.

3. The conference system according to claim 2, wherein the detecting unit detects that an event has occurred when an operation with respect to the second conference device is received.

4. The conference system according to claim 2, wherein the detecting unit detects that an event has occurred when voice collected by the second voice collecting unit has a predetermined sound volume or more.

5. The conference system according to claim 2, wherein the detecting unit detects that an event has occurred according to an operation of an application executed by the second conference device.

6. The conference system according to claim 2, wherein the first conference device comprises an integrated video conference device which comprises a camera that is the first image taking unit, a microphone that is the first voice collecting unit and a speaker that outputs voice.

7. The conference system according to claim 2, wherein the second conference device comprises an interactive whiteboard that includes a camera that is the second image taking unit, a microphone that is the second voice collecting unit, a speaker that outputs voice and a display that displays a video image, and receives an operation with respect to the display.

8. A conference system that comprises a first conference device and a second conference device installed at a first site, and that is connected with an external conference device installed at a site different from the first site and an event management server through a network, wherein:
the first conference device comprises:
a first image taking unit that takes a video image of a conference attendee at the first site,
the second conference device comprises:
a second image taking unit that takes a video image of a conference attendee at the first site;
a video image input unit that receives the video image taken by the first image taking unit;
a detecting unit that detects an event which has occurred at the first conference device and the second conference device; and
a first transmitting unit that, when an event is detected at a conference device, transmits event information comprising details of the event and event occurrence device information indicating the conference device at which the event has occurred, to the event management server,
the event management server comprises:
a memory unit that stores event condition information in which event identification information unique for each event and an event condition to detect an event when details of the event satisfy the event condition are associated with each other;
a first receiving unit that receives event information from the second conference device;
an event processing unit that, when details of an event in the received event information satisfies an event condition, determines a video image taken by a conference device indicated by event occurrence device information in the event information as a video image of the first site; and
a second transmitting unit that transmits determined device information indicating a conference device that has taken the determined video image, to the second conference device,
the second conference device further comprises:
a second receiving unit that receives determined device information from the event management server; and
a selecting unit that selects the video image taken by a conference device indicated by determined device information, and
the first transmitting unit transmits the selected video image to the external conference device.

9. The conference system according to claim 8, wherein:
the first conference device further comprises:
a first voice collecting unit that collects voice of a conference attendee at the first site,
the second conference device further comprises:
a second voice collecting unit that collects voice of a conference attendee at the first site; and
a voice input unit that receives the voice collected by the first voice collecting unit,
when details of an event of the received event information satisfies an event condition, the event processing unit determines a video image and voice taken and collected by a conference device indicated by event occurrence device information in the event information as a video and voice of the first site;
the second transmitting unit transmits determined device information indicating a conference device that has taken the determined video image and collected the determined voice, to the second conference device;
the selecting unit selects a video image and voice taken and collected by a conference device indicated by the determined device information; and
the first transmitting unit transmits the selected video image and voice to the external conference device.

10. The conference system according to claim 9, wherein:
the memory unit further stores device information in which device identification information unique for each conference device and order of priority of the conference devices to determine a conference device, a video image and voice taken and collected by which are selected as a video image and voice of the first site, are associated with each other; and when a predetermined period of time passes after event information is received, the event processing unit determines a video image and voice taken and collected by a conference device of a higher priority in the device information among the conference devices, as a video image and voice of the first site.

11. The conference system according to claim 9, wherein order of priority of events which occur in the conference devices, according to which a video image and voice taken and collected by a conference device are determined as a video image and voice of the first site, is further associated in the event condition information; and when a plurality of pieces of event information are received simultaneously or successively, the event processing unit determines a video image and voice taken and collected by a conference device in which an event of a higher priority in the order of priority of events in the event condition information has occurred, as the video image and the voice of the first site.

12. The conference system according to claim 8, wherein the detecting unit determines that an event occurs when a video image taken by the first image taking unit or the second image taking unit comprises a predetermined feature.

13. An event management server that is connected with a second conference device through a network among a first conference device and the second conference device installed at a first site, the event management server comprising:

a memory unit that stores event condition information in which event identification information unique for each event which occurs in the first conference device and the second conference device, and an event condition to detect an event when details of the event satisfies the event condition are associated with each other;

a receiving unit that receives event information comprising details of an event and event occurrence device information indicating a conference device in which the event has occurred;

an event processing unit that, when details of an event in the received event information satisfy an event condition, determines a video image taken by a conference device indicated by event occurrence device information in the event information, as a video image at the first site; and a transmitting unit that transmits determined device information indicating a conference device that has taken the determined video image, to the second conference device.

* * * * *